United States Patent Office 3,093,509
Patented June 11, 1963

3,093,509
PROCESS FOR MAKING COPPER FILMS
Samuel Wein, 98 Bigelow St., Quincy, Mass.
No Drawing. Filed Sept. 28, 1959, Ser. No. 842,572
1 Claim. (Cl. 117—213)

This invention relates to a new process for forming an adherent surface of brilliant, hard, metallic copper on glass, plastic and similar materials. In particular, it relates to copper mirrors, electrotypes, printed circuits, and the like prepared by simple, inexpensive, reliable, and reproducible means, wherein no volatile materials are used and the resultant copper layer can be made much thicker than by prior art methods.

This application is a continuation-in-part of my pending application, Serial No. 661,613 filed May 27, 1957.

In essence, this invention comprises first sensitizing the non-metallic backing, such as glass or plastic, preferably with an aqueous tin salt solution, supersensitizing the resultant surface, preferably with diluted silvering solution or palladium solution, and then applying an aqueous alkaline solution of soluble copper salt, organic chelating agent, and copper reducing agent.

SENSITIZING

In the preferred method of sensitizing, the backing surface is cleaned and washed, polished with rouge if it is a transparent material such as glass, and then treated with an aqueous tin salt solution.

Sensitizing agents are most preferably those tin containing compounds that can be stored dry until use is desired at which time water is added. Such include, for example, tin chloride and sulfamic acid; stannous gluconate; sodium acid sulfate and tin chloride.

The stannous gluconate solution may be prepared by dissolving sodium gluconate and tin chloride in water and allowing the solution to contact the surface for about one-half minute. This solution can be applied directly to the cleaned surface by dipping, sponging, spraying, or any similar techniques. A ratio of substantially one part by weight of sodium gluconate to two parts by weight of stannous chloride is particularly useful. Further, the ingredients of this sensitizing solution can be shipped and stored dry and formed into solution when needed. The stannous gluconate can also be prepared as a pure powder and used as such. In such case, aqueous stannous chloride solution can be mixed with ammonium hydroxide to precipitate stannous hydroxide, which is filtered, washed, and then refluxed with sodium gluconate solution from which the stannous gluconate is prepared by crystallization.

Other previously described sensitizing methods can be used including for example, a solution of tin chloride with glutamic acid hydrochloride.

SUPERSENSITIZING

Supersensitizing agents comprise generally, solutions of salts of metals such as gold, silver, platinum or palladium. However, supersensitizing is preferably accomplished by treating the sensitized surface with palladium salt in acid solution, or by diluted silvering solution. One example of silvering solution comprises an admixture of A and B as follows:

(A) Silver salt, organic chelating agent, water.
(B) Hydrazine sulfate or hydroxylammonium sulfate, water, sodium carbonate.

Spraying is the recommended technique, but any controllable method of application can be used. The result is typically a brownish, metallic finish. Supersensitizing with palladium is exemplified by the use of palladium chloride in acid soltuion.

COPPERING

The coppering solution is aqueous and alkaline. It requires primarily that the copper be in chelated form. The copper salt and organic chelating may be reacted separately to form the copper chelate, which is then mixed with the reducing agent just before intended use.

One example of a coppering solution is a mixture of the following components (1) and (2), (1) Soluble copper salt with or without soluble nickel salt, "VISCO."
(2) Copper reducing agent, water, alkali.

This coppering solution, when applied to the supersensitized surface, yields a copper film in a few seconds, which film is complete, brilliant, and hard in a few minutes.

Other chelating agents which have been found especially useful in the coppering solution and are illustrated below are di-sodium ethylene diamine tetra-acetic acid (disodium EDTA) and sodium gluconate or correspondingly copper gluconate. Gluconate is especially preferred for use with plastic surfaces.

A number of examples of this invention are given below:

Example I—Sensitizing Solution (A) 20 grams of sodium gluconate are dissolved in one-half gallon of water.
(B) 20 grams of stannous chloride are dissolved in one-half gallon of water.

The two solutions A and B are then mixed together. In storage the dry components must be separately packaged, since under normal conditions a mechanical mixture will become a gummy mass.

The solution is applied to a non-metallic surface such as glass or plastic and allowed to stand for a half minute. Then the surface is rinsed with water.

Example II—Sensitizing Solution

Stannous chloride hydrate_____grams__ 338.4
Water _____cc__ 1500

Sufficient ammonium hydroxide is added to precipitate the stannous hydroxide. Sufficient inert carrier (e.g. a silicaceous or diatomaceous compound) is added to aid in filtration. The washed precipitate is then refluxed with 400.5 grams sodium gluconate in 155 cc. water for 3 hours with stirring. After cooling and filtering, the filtrate is freeze-dried to yield 550 grams of stannous gluconate. This can be stored dry and is stable. The sensitizing solution is then made by dissolving 15 grams of stannous gluconate in a gallon of water. This is applied to the cleaned non-metallic surface for about half-a-minute and then rinsed with water.

Example III—Sensitizing Solution (A) 20 grams of sodium gluconate is dissolved in one-half gallon of water.
(B) 10 grams of stannous chloride is dissolved in one-half gallon of water.

The materials are separately packaged when dry to avoid the formation of a gummy mass which commonly occurs with a dry mixture. In using these materials, solutions A and B are mixed together, applied to glass, plastic or other non-metallic surface and allowed to stand a half-minute before rinsing. Films deposited on a surface treated with this sensitizing solution are quite adherent, hard, and useful, but are of somewhat less brilliance than films deposited on a surface treated with the sensitizing solution of Example I.

Example IV—Sensitizing Solution

Grams per gallon
Sulfamic acid_____ 20

| | Grams per gallon |
|---|---|
| Tin chloride | 16 |
| Wetting agent | 1 |
| Make up with water. | |

Wetting agents that can, for example, be used include:
 (a) duPonal ME (a fatty alcohol sulfate made by the duPont Co., Wilmington, Del.)
 (b) Renex #235 (polyoxyethylene esters of mixed fatty and resin acids made by the Hercules Powder Co., Wilmington, Del.)

The wetting agent can be omitted for use with glass or ceramic but is preferred for use with plastic surfaces. The solution is applied to the surface for 10–20 seconds and the surface is then rinsed with water.

Example V—Sensitizing Solution

| | Grams per gallon |
|---|---|
| Glutamic acid hydrochloride | 20 |
| Tin chloride | 16 |
| Make up with water. | |

Here, too, if the surface is other than glass, a wetting agent should be added. The solution is applied for about half-a-minute and the surface then rinsed with water.

Example VI—Supersensitizing Solution (A)

| | | |
|---|---|---|
| "TRIS" | grams | 42 |
| Silver nitrate | do | 2 |
| Water | gallon | 1 |

(B)

| | | |
|---|---|---|
| Hydraxine sulfate | gms | 8.5 |
| Sodium carbonate | gms | 17 |
| Water | gallon | 1 |

A mixture of the above solutions is applied by standing, dipping or spraying, followed by rinsing with water. The result is a brownish tinge, with only faint metallic appearance and slower to form as compared with Examples VII and VIII (below). Adherence and support for the copper film is adequate for printed circuits and the like, but the brilliance of the resultant product is inferior to Examples VII and VIII especially as regards mirrors.

Example VII—Supersensitizer (A)

| | | |
|---|---|---|
| "TRIS" | grams | 42 |
| Silver nitrate | do | 2 |
| Water | gallon | 1 |

(B)

| | | |
|---|---|---|
| Hydrazine sulfate | grams | 8.5 |
| Sodium carbonate | do | 17.0 |
| Water | gallon | 1 |

The above solutions (A) and (B) are preferably applied to the previously sensitized surface by simultaneous spraying and then rinsing with water. The result is a brownish tinge with a slight metallic appearance (silverish).

Example VIII—Supersensitizer (A)

| | | |
|---|---|---|
| "TRIS" | grams | 42 |
| Silver nitrate | do | 4 |
| Water | gallon | 1 |

(B)

| | | |
|---|---|---|
| Hydroxylammonium sulfate | grams | 2 |
| Sodium carbonate | do | 8 |
| Water | gallon | 1 |

The above solutions (A) and (B) are preferably applied to the previously sensitized surface by simultaneous spraying and then rinsing with water. The result is a brownish tinge with a slight metallic appearance (silverish).

Example IX—Supersensitizer

| | | |
|---|---|---|
| Palladium chloride, 10% solution | grams | 10 |
| Hydrochloric acid | mls | 200 |
| Renex #235 (wetting agent) | gram | 1 |
| Water | mls | 800 |

To 30 ml. of this solution, is added sufficient water to make up a gallon of diluted solution.

The surface previously sensitized and rinsed is now treated with the present solution. The wetting agent is not necessary when glass surfaces are to be coppered. However, it is preferable for plastic and ceramic surfaces.

Example X—Coating With Copper-Nickel Alloy (A)

| | | |
|---|---|---|
| Copper sulfate | grams | 189 |
| Nickel nitrate | do | 94.5 |
| "VISCO" | do | 441 |
| Water | gallon | 1 |

(B)

| | | |
|---|---|---|
| Formaldehyde | grams | 63 |
| Glyoxal | do | 18.9 |
| Sodium hypophosphite | do | 0.063 |
| Gum arabic | do | 94.5 |
| Water | gallon | 1 |

(C)

| | | |
|---|---|---|
| Sodium hydroxide | grams | 189 |
| Water | gallon | 1 |

(A), (B) and (C) are mixed together and then poured onto the previously sensitized and supersensitized surface at room temperature. The copper film forms in between 3 to 4 seconds and the optimum thickness is attained in 3 to 4 minutes. The product is then washed with water. The result is a thick, brilliant copper mirror film which is adherent and sufficiently hard to permit ease of further manipulation, such as etching of geometric designs and electrical circuits.

Example XI—Coating With Copper (A)

| | | |
|---|---|---|
| Copper sulfate | grams | 3.5 |
| "VISCO" | cc | 50 |
| Water | cc | 450 |

(B)

| | | |
|---|---|---|
| Hydrazine sulfate | grams | 10 |
| Sodium hydroxide | do | 9 |
| Water | cc | 450 |

Equal volumes of (A) and (B) solutions, when mixed together and poured on a previously sensitized and supersensitized surface produce a film of metallic copper. The film is hard but not as hard as the film in Examples VII and IX.

Example XII—Coating With Nickel-Copper Alloy (A)

| | | |
|---|---|---|
| Copper sulfate | grams | 190 |
| Nickel nitrate | do | 95 |
| Gum arabic | do | 63 |
| "VISCO" | do | 441 |
| Water | gallon | 1 |

(B)

| | | |
|---|---|---|
| Formaldehyde | grams | 44 |
| Sodium hydrophosphite | do | 0.4 |
| Glyoxal | do | 12 |

(C)

| | | |
|---|---|---|
| Sodium hydroxide | grams | 120 |
| Water | gallon | 1 |

Solutions (A), (B) and (C) are mixed together and then immediately poured on the supersensitized surface to form a film as in Example VII.

Example XIII—Coating With Copper (A)

| | | |
|---|---|---|
| Disodium EDTA | grams | 61 |

Copper sulfate _____ do____ 80
Water _____ gallons__ ½

(B)

Formaldehyde _____ ml__ 300

After (A) is prepared as a solution, (B) is added and solution is made up to a gallon with water.

To the mixture of (A) and (B) is added an equal volume of the following solution (C):

71% Sodium hydroxide—70 grams
29% Soda ash
Rochelle salt—150–225 grams
Water, make up to one gallon.

If the resultant mixture is poured onto a previously sensitized and supersensitized surface at room temperature, an adherent and brilliant copper film will form within 15 minutes. It is then rinsed with water.

If the (A)—(B) and (C) solutions are separately heated to 60° C. and then mixed in equal volumes and applied to a previously sensitized and supersensitized surface a brilliant and adherent copper film forms in minutes. The (C) mixture may be diluted 50% with water and still be equally effective.

*Example XIV—Completely Dry Coppering Ingredients*

If 128 grams of paraformaldehyde are substituted for the 300 ml. of formaldehyde in Example XIII, the results are practically identical. The advantage is that all the ingredients for the coppering solution are dry, stable solids and may be stored and shipped as such.

*Example XV—Coppering Solution Using Sodium Gluconate*

(A)

Sodium gluconate _____ grams__ 30
Copper sulfate _____ do____ 81
(X) Sodium citrate (buffer) _____ do____ 83
Water, make up to 1 gallon.

(B)

(X) Formaldehyde _____ ml__ 30
(or Paraformaldehyde 128 grams)

(C)

(Y) Rochelle salts _____ grams__ 255
Water, make up to 1 gallon.

(D)

71%—Sodium hydroxide } _____ grams__ 71
29%—Soda ash }

After solution (A) is prepared, (B) is added to it. Solution (C) is then made and (D) added to it. If (X) and (Y) are mixed in equal proportions and applied to a previously sensitized and supersensitized surface, homogeneous copper surfaces will be formed depending on speed or temperature. The solutions are preferably heated to the desired temperature before mixing and applying, the most useful range of temperatures being 30–70° C.

Previously formed copper gluconate can be used in place of copper sulfate and sodium gluconate. Gluconated copper in general appears to give copper films of greater adherence, especially with plastic surfaces.

The chelating agent, "TRIS," shown in Examples IV, VII, and VIII is tris-(hydroxymethyl) amino methane made by Commercial Solvents Corp. Other useful organic chelating agents include: 2-amino-1-butanol; 2-amino-methyl-1-propanol; 2-amino-2-methyl-1,2-propanediol; ethylendediamine tetra acetic acid and salts thereof; monohydroxyethyltrihydroxy-propylethylene-diamine, 2-amino-2-ethyl-1,3-propanediol, sulfamic acid, protein amino acids, and mixtures thereof.

The chelating agent "VISCO," is the monohydroxyethyltrihydroxypropylethylandediamine of Visco Products Co., Houston, Texas. Other organic chelating agents which may be used for the coppering solution include, for example, soluble gluconate salts or alkaline ethylene diamine tetra-acetic acid or any of the organic chelating agents described in the preceding paragraph.

A mixture of soluble copper and nickel salts is preferred, to obtain films of the greatest hardness. However, a soluble copper salt, such as copper sulfate, copper nitrate, copper chloride, etc. may be used without any nickel to form copper films of sufficient hardness for many purposes, as shown in the examples.

Mirrors, electrotypes, and electrical "Printed" circuits formed in accordance with this invention are of excellent adherence, brilliance, and hardness, and further, can be made of much greater film thickness than by previously described methods.

I claim:

A process for applying a copper layer to a previously sensitized and super-sensitized surface comprising contacting the surface with an alkaline aqueous solution comprising copper gluconate and copper reducing agent.

References Cited in the file of this patent

UNITED STATES PATENTS

| | | |
|---|---|---|
| 2,183,202 | Misciattelli | Dec. 12, 1939 |
| 2,190,121 | Misciattelli | Feb. 13, 1940 |
| 2,363,354 | Peacock | Nov. 21, 1944 |
| 2,602,757 | Kantrowitz et al. | July 8, 1952 |
| 2,871,139 | Wein | Jan. 27, 1959 |
| 2,955,958 | Brown | Oct. 11, 1960 |

OTHER REFERENCES

Marboe et al.: "The Chemical Deposition of Copper Mirrors on Glass"; The Glass Industry; Volume 26, No. 3, pp. 137, 138, and 142, March, 1945.

Wein, "The Formation of Copper Films on Non-Conductors—A Survey"; Metal Finishing; pages 58, 59, 60 and 69, August, 1948.

Narcus, "The Role of Chelating Agents in the Plating Industry"; Metal Finishing, Volume 50, No. 3, pages 54–62, March, 1952.